United States Patent [19]
Vanden Heuvel et al.

[11] Patent Number: 5,426,424
[45] Date of Patent: Jun. 20, 1995

[54] SELECTIVE CALL RECEIVER WITH DATABASE CAPABILITY

[75] Inventors: Dean P. Vanden Heuvel, Chandler; Craig C. Halley, Mesa, both of Ariz.

[73] Assignee: Motorola, Inc., Schaumburg

[21] Appl. No.: 880,614

[22] Filed: May 8, 1992

[51] Int. Cl.[6] .............................................. H04Q 7/00
[52] U.S. Cl. ............................. 340/825.44; 340/311.1
[58] Field of Search ....................... 340/825.44, 311.1; 379/57, 201, 211, 67, 88, 89; 364/401

[56] References Cited

U.S. PATENT DOCUMENTS

| | | | |
|---|---|---|---|
| 4,713,808 | 12/1987 | Gaskill et al. | 340/825.44 |
| 4,839,628 | 6/1989 | Davis et al. | 340/311.1 |
| 5,054,051 | 10/1991 | Hoff | 379/56 |
| 5,157,391 | 10/1992 | Weitzen | 340/825.44 |
| 5,177,477 | 1/1993 | Fennell et al. | 340/825.44 |
| 5,185,604 | 2/1993 | Nepple et al. | 340/825.44 |

FOREIGN PATENT DOCUMENTS

WO88/09104  11/1988  WIPO .......................... H04Q 7/00

Primary Examiner—Donald J. Yusko
Assistant Examiner—Edward Merz
Attorney, Agent, or Firm—Gregg E. Rasor

[57] ABSTRACT

A selective call receiver (100) for facilitating storage and presentation of a received selective call message. A microcontroller (105) executes a microcode program that controls operation of the selective call receiver (100). Received messages are stored by a memory manager (119) in a memory (115) coupled to the microcontroller (105). The memory manager (115) allocates and deallocates memory blocks, each block corresponding to a memory storage area (504) capable of storing at least a portion of the received message. The memory manager (119) also maintains a dynamic list (505) representing used and unused memory slots, the list being initialized in response to receipt of a database configuration message (301, 302) and updated in response to subsequent received selective call messages. An access manager (120) controls access to received selective call messages by grouping received messages by classification as determined at least in part by a portion of the received selective call message and the database configuration message (301, 302).

11 Claims, 11 Drawing Sheets

*100*

| 201 | 1 | 2-19 | 20/21 | 22-31 | 32 |
|---|---|---|---|---|---|
| 202 | 0 | ADDRESS / ID | FUNC BITS | ERROR CORRECTING CODE | PE |
| | 1 | MESSAGE | | ERROR CORRECTING CODE | PE |

*FIG. 2*

| 301 | 1 | 2-8 | 9-11 | 12-19 | 20-32 |
|---|---|---|---|---|---|
| | 1 | DATABASE MSG CMD | RES | DATABASE ID | ERROR CHECK |
| 302 | 1 | 2-12 | | 13-19 | 20-32 |
| | 1 | START BLOCK | | RESERVED | ERROR CHECK |

*FIG. 3*

| 401 | 1 | 2-8 | 9-11 | 12-19 | 20-32 |
|---|---|---|---|---|---|
| | 1 | ADD/DELETE CMD | FNC | RESERVED | ERROR CHECK |

*FIG. 4*

SELECTIVE CALL RECEIVER WITH DATABASE CAPABILITY

FIELD OF THE INVENTION

This invention relates in general to selective call receivers and more particularly to a selective call receiver capable of accessing received messages as a database.

BACKGROUND OF THE INVENTION

Selective call communication (paging) systems typically comprise a radio frequency transmitter/encoder (base station) that is accessed via a link to the Public Switched Telephone Network (PSTN) and a radio receiver (e.g., a selective call receiver or the like) that has at least one unique call address associated therewith. Operationally, the selective call receiver receives and decodes information transmitted from the base station, the information having an address and possibly a data or voice message. When the selective call receiver detects its address, it typically alerts the user and presents any received information.

To implement messaging capability in a paging system, the address and message information referred to are transmitted using a protocol such as GSC (Motorola's Golay Sequential Code) or POCSAG (a code from Great Britain's Post Office Code Standardisation Advisory Group). These protocol formats are designed to communicate messages to at least one selective call receiver and are well known to one of ordinary skill in the art of Paging systems. A typical selective call message may consist of an address signal if the message is a tone only message, or an address signal and a data packet if the message is a data message.

Present selective call receivers receive messages in a first in—last out format, that is, the newest message is displayed or located at the top of a message queue and the oldest message is at the bottom of the message queue. Because a user must navigate through the messages received after the message that the user desires to present, this organization is quite cumbersome if a user desires to retrieve a message anywhere except at the top of the message queue. Furthermore, if the selective call receiver has either multiple addresses or sub-addressing capability (multiple addresses decoded from data transmitted in conjunction within a single conventional address), the received messages are stored in the same order as if they were received in a simplistic single address selective call receiver. This forces the user to search through many unrelated messages to find a message of interest.

A further problem with contemporary selective call receivers is that received messages are stored in sequentially allocated memory slots that are fixed in length at the time of receipt of a message. This creates a problem when the user deletes a message, in that the memory slot(s) previously occupied by the message(s) are left unused until message memory is cleared. In conventional selective call receivers, the only time that message memory is cleared is when the receiver's power is removed or a system reset occurs. Both of these alternatives are not desirable as they both cause the loss of all previously received messages.

Consequently, there is a need for a system in a selective call receiver that can efficiently manage a dynamic allocation of available message memory while at the same time maintaining a dynamically configured hierarchical structure that allows a user easy access to received selective call messages.

SUMMARY OF THE INVENTION

Briefly, according to the invention, there is provided a selective call receiver for facilitating storage and presentation of at least one received selective call message. The selective call receiver comprises a microcontroller including a processor that executes a microcode program for controlling operation of the selective call receiver, at least one memory coupled to the microcontroller for storing the at least one received selective call message, a memory manager coupled to the microcontroller for controlling allocation and deallocation of at least one memory block in the at least one memory, each memory block corresponding to a memory storage area capable of storing at least a portion of the at least one received selective call message, the memory manager operating to maintain a dynamic list representing used and unused memory blocks, the dynamic list being initialized in response to receipt of a database configuration message and updated in response to subsequent received selective call messages, and an access manager coupled to the microcontroller for controlling access to the at least one received selective call message stored in the at least one memory by grouping the at least one received selective call message in at least one classification as determined at least in part by a portion of the at least one received selective call message and the database configuration message.

Furthermore, there is provided a method in a selective call receiver for facilitating storage and presentation of at least one received selective call message. The method comprises executing a microcode program in a microcontroller having a processor and being coupled to at least one memory for storing the at least one received selective call message, the microcode program operating to control operation of the selective call receiver, controlling allocation and deallocation of at least one memory block in the at least one memory with a memory manager coupled to the microcontroller, each memory block corresponding to a memory storage area capable of storing at least a portion of the at least one received selective call message, the memory manager operating to maintain a dynamic list representing used and unused memory blocks, the dynamic list being initialized in response to receipt of a database configuration message and updated in response to subsequent received selective call messages, and controlling access to the at least one received selective call message stored in the at least one memory with an access manager coupled to the microcontroller by grouping the at least one received selective call message in at least one classification as determined at least in part by a portion of the at least one received selective call message and the database configuration message.

BRIEF DESCRIPTION OF THE DRAWINGS

FIG. 2 illustrates a structure of a typical personal selective call message that may be received by the selective call receiver of FIG. 1.

FIG. 3 illustrates a typical database configuration and data delivery selective call message that may be received by the selective call receiver of FIG. 1.

FIG. 4 illustrates a typical database add/delete selective call message that may be received by the selective call receiver of FIG. 1.

DESCRIPTION OF A PREFERRED EMBODIMENT

Figure 1:
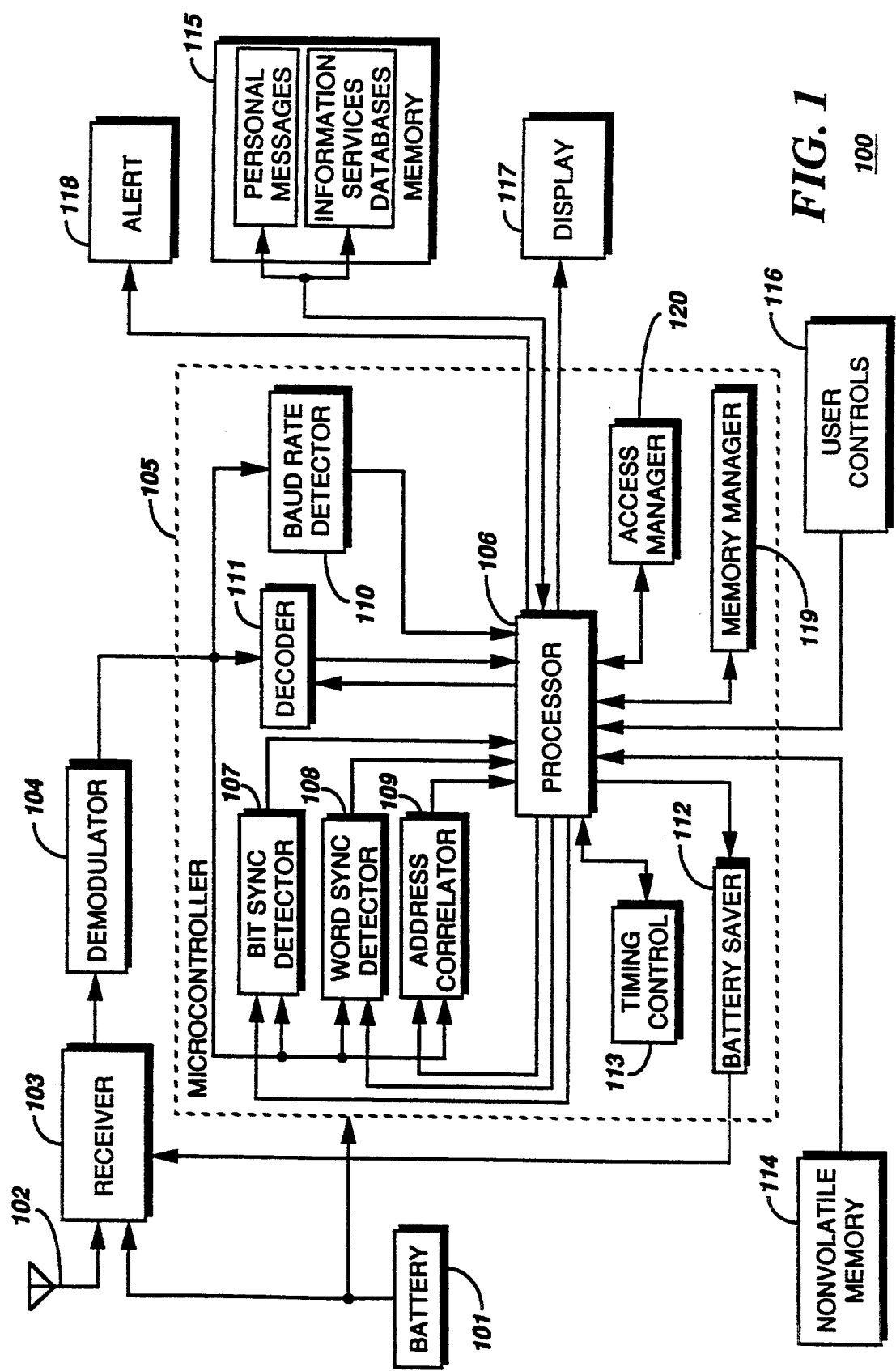
FIG. 1 is a block diagram of a selective call receiver that operates in accordance with the preferred embodiment of the present invention.

Referring to FIG. 1, a battery 101 powered selective call receiver 100 operates to receive a signal via an antenna 102. A receiver 103 couples the received signal to a conventional demodulator 104 that is capable of recovering analog or digital information. Received digital information is recovered as a serial bit stream that is then coupled to a micro-controller 105 for interpreting and decoding the serial bit stream as address, control, and data signals. In the preferred embodiment, the micro-controller 105 may comprise a processor 106, a bit synchronization detector 107, a word synchronization detector 108, an address correlator 109, a baud rate detector 110, a data decoder 111, a battery saver 112, and a timing generator 113, implemented in hardware, software, or a combination thereof. Examples of commercially available micro-controllers suitable for implementing the preferred embodiment of the present invention are Motorola's MC68HC05xx or M68HC11xx. Complete descriptions of these devices are available in Motorola's data book set entitled "Microprocessor, Microcontroller, and Peripheral Data," volumes I and II, Series A, © 1988 by MOTOROLA, INC.

More specifically, in the microcontroller 105 the serial bit stream is coupled to the baud rate detector 110 that determines a receiving data rate associated with the recovered information. When the receiving data rate is determined, the bit synchronization detector 107 establishes synchronization between the microcontroller's 105 data decoding components (106, 109, and 111) and the individual signals (e.g., address, control, and data signals) in the recovered information. Once bit synchronization is established, the word synchronization detector 108 searches the serial bit stream for information indicating the beginning of a batch or frame. When the microcontroller 105 has established both bit and word synchronization, the recovered information may be searched for a group identification code associated with the selective call receiver. When the selective call receiver's group identification code is found, the receiver will search only those code frames associated with the receiver's group for pages intended for the selective call receiver. During the period between like frames, the micro-controller 105 may "shut-down" the receiver 103 and demodulator 104, thereby conserving battery power. The predetermined interval between like frames is known in the art as a "sleep" period. Since many selective call signalling protocols are designed such that pages targeted for a specific group identifier, of which each selective call receiver is a member of at least one group, are sent only during the transmission of that group, no pages are missed during the sleep period. A receiver that operates in the fashion discussed above is said to be operating in a "battery saving" mode.

In determining the selection of a particular selective call receiver, a correlation is performed between a predetermined address associated with the selective call receiver and a received address. To accomplish this, the address correlator 109, which comprises a signal processor, correlates a recovered address with the predetermined address or addresses stored in the selective call receiver's nonvolatile memory 114 or code plug. Optionally, the nonvolatile memory 114 may reside inside a support integrated circuit (not shown) or in the micro controller 105. Typically, a portion of the nonvolatile memory 114, commonly referred to as a code plug, is dedicated to the storage of receiver configuration and address data that is accessed by the microcomputer. This data may be stored in at least one register in the form of digital words or bits that are interpreted by the microcomputer in a conventional manner to characterize the operation of the selective call receiver. By altering the code plug information, the various options, features, and functions of a selective call receiver may be varied. When the received address correlates with an active programmed address, the micro-controller 105 may in a tone-only mode activate an alert 118. Alternatively, if a data (numeric or alphanumeric) address is received, the decoder 111 couples message information to a portion of a memory 115 set aside for either personal or information service messages.

In accordance with the recovered information, and settings associated with the user controls 116, the selective call receiver presents at least a portion of the message information, such as by a display 117, and may signal the user via an audible, visual, or tactile alert 118 that a message has been received. The user may view information that is automatically presented on the display 117 or manually presented in response to activating the appropriate user controls 116.

The microcontroller 105 may also include items such as a conventional signal multiplexer, a voltage regulator and control mechanism, a current regulator and control mechanism, environmental sensing circuitry such as for light or temperature conditions, audio power amplifier circuitry, control interface circuitry, and display illumination circuitry. These elements are arranged in a known manner to provide an information receiver as requested by a customer.

In this preferred embodiment, the microcontroller 105 includes a memory manager 119 and an access manager 120. The memory manager 119 controls allocation and deallocation of at least one memory block in the at least one memory 115, where each memory block corresponds to a memory storage area capable of storing at least a portion of the at least one received selective call message. Furthermore, the memory manager operates to maintain a dynamic list representing used and unused memory blocks, the dynamic list being initialized in response to receipt of a database configuration message and updated in response to subsequent received selective call messages. These functions and the organization of a memory register control model associated with the selective call receiver are more thoroughly discussed in reference to FIGS. 5-13.

The access manager 120 functions to control access to the at least one received selective call message stored in the at least one memory 115 by grouping the at least one received selective call message in at least one classification as determined at least in part by a portion of the at least one received selective call message and the database configuration message. Message access is determined in accordance with the memory register control model discussed in reference to FIGS. 5-13.

Referring to FIG. 2, a structure of a typical personal selective call message that may be received by the selective call receiver of FIG. 1 is illustrated. The message depicted is in a POCSAG format (a code from Great Britain's Post Office Code Standardisation Advisory Group) comprising two 32-bit code words. The first code word 201 is a POCSAG address code word as denoted by a first bit equal to zero. The POCSAG address code word 201 illustrated comprises areas including an address ID in bits 2-19, function bits in bits 20 and 21, error correcting code in bits 22-31, and an end-of-code word flag in bit 32. In a POCSAG data message, the address code word 201 is followed by a POCSAG message code word 202 denoted by a 1 in the first bit position of the 32-bit code word. The POCSAG message code word 202 further comprises 20 bits of data in bits 2-21 representing a message, an error correcting code in bits 22-31, and a code word end bit at bit 32. Using this format, both numeric and alphanumeric messages can be reliably transmitted to a selective call receiver as depicted in FIG. 1.

Referring to FIG. 3, a typical database configuration and data delivery selective call message that may be received by the selective call receiver of FIG. 1 is illustrated. This message comprises two unique 32-bit code words, each treated as message code word by a conventional POCSAG decoder. The conventional POCSAG decoder treats the codewords illustrated in FIG. 3 as message data because bit 1 of each code word is set to 1. This allows the interleaving of the special code words along with standard POCSAG message code words without having to modify the addressing structure inherent in the POCSAG standard. A first database code word 301 comprises a database message command in bits 2-8, a reserve field in bits 9-11, a database identification in bits 12-19, and an error check in bits 20-32. In the second database code word 302, bits 2-12 indicate a start block for a received message or command, bits 13-19 are reserved, and bits 20-32 are an error check. The database configuration and data delivery selective call message code words depicted in FIG. 3 are multi-purpose in nature, that is, using a first database message command, a code word format may be used to configure a particular database structure in the memory of the selective call receiver. This configuration may include the allocation and deallocation of reserved memory areas to which particular database entries are targeted upon receipt. Using a different database message command, a service provider may authorize or deauthorize the reception of or access to particular database areas or entries therein by the user of the selective call receiver. In conjunction with the preferred embodiment of the present invention, memory for storage of received database structures and/or messages is dynamically allocated only as needed. This improvement yields significant advantages when viewed in light of prior art selective call receivers with database capability. More particularly, prior art database selective call receivers perform static allocation of memory resources in response to the reception of a database code word commanding a new database structure. As an example, a prior art database selective call receiver receives a database configuration code word requesting 16 databases each having 16 possible entries of 40 characters each. The prior art database selective call receiver, in response to the receipt of this configuration message, would attempt to reserve a minimum of 10,240 bytes of memory storage. This memory is reserved as a static contiguous block, regardless of the fact that the actual database messages received by the selective call receiver may occupy only 2,000 bytes of the memory. As can be seen, the prior art receiver would waste the remaining 8,240 bytes since it is reserved but unused by messages. The instant invention improves upon the prior art by dynamically allocating memory blocks in either contiguous or noncontiguous fashion as discussed in reference to FIGS. 5-7 and in reference to the flow diagrams in FIGS. 9-13. This improvement allows more databases to be allocated since the storage intended for each database is not used until an actual database selective call message is received.

Referring to FIG. 4, a database add/delete selective call message 401 is shown comprising a 1 bit in bit 1, denoting a message code word, an add/delete command in bits 2-8, function bits in bits 9-11, a reserved area in bits 12-19, and an error check in bits 20-32. In response to the receipt of code word 401, the selective call receiver illustrated in FIG. 1 functions to add or delete a database as identified in code word 301 in FIG. 3. The add/delete code word provides flexibility in enabling or disabling specific databases within the structure set up in the selective call receiver of FIG. 1. The function of the add/delete codeword is more fully explained in reference to FIGS. 11 and 13.

Figure 5:
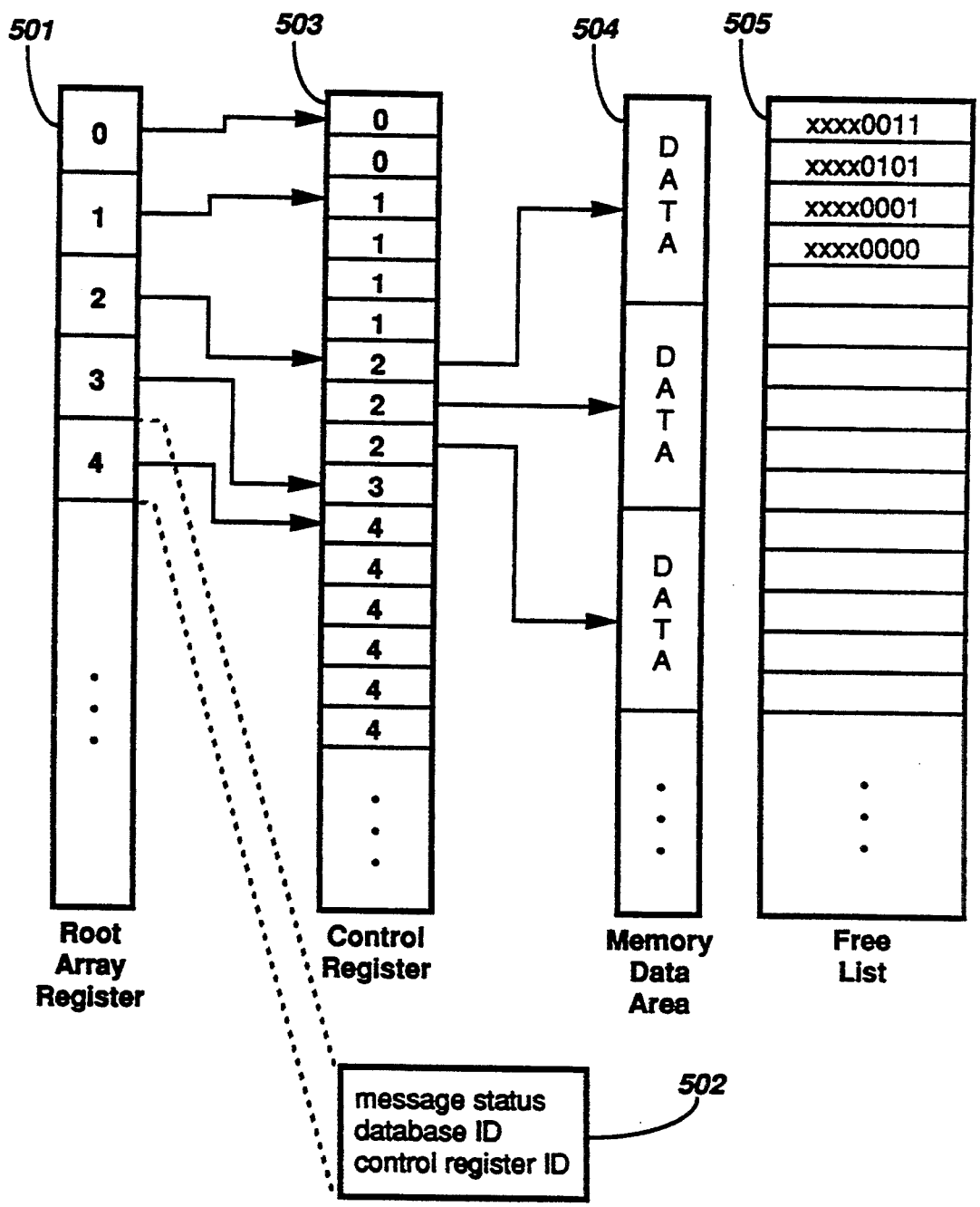
FIG. 5 illustrates a register structure for implementing a memory and a message access manager in accordance with the preferred embodiment of the present invention.

Referring to FIG. 5, a register structure is illustrated that implements a memory and a message access manager in accordance with the preferred embodiment of the present invention. The register structure in FIG. 5 comprises a root array register 501 containing a plurality of elements. Each root array element 502 comprises a status indicator, which determines an icon displayed for the message represented by the element, a control register ID that indicates at least one location associated with a corresponding control node in a control register 503, and a database ID that identifies the database to which the information belongs. The control register 503 comprises a number of control nodes. Each memory block in a memory data area 504 has a control node associated therewith, the control node indicating where in memory the memory block is located, a block type (e.g., a personal selective call message, a database selective call message, etc.) and other information specific to a particular block of data. The size of the control register is determined by the amount of memory available and is easily extensible to accommodate databases of unlimited size. The architecture shown in FIG. 5 is flexible in that a database or message can be of any length, and therefore can have any number of control nodes associated therewith. As shown in FIG. 5, slot 0 of the root array register 501 has two control nodes in the control register, slot 1 in the root array register 501 has four control nodes in the control register 503, whereas slot 3 in the root array register 501 has only one control node in the control register 503. The control nodes in the control register 503 are dynamically allocated upon receipt of a selective call message as determined both by the size or the message and the minimum size of the memory block allocatable in the memory data area 504.

In the preferred embodiment of the present invention, all control nodes for a database or personal selective call message are stored sequentially in the control register 503 to eliminate complex searching when moving from one node to the next. As previously mentioned, each control node contains information denoting message type, database identification, and other pertinent features that can be identified as each node is inspected. This architecture allows extremely rapid movement from one message to another or one database to another while accessing entries in the control register 503. To maintain quick access to selective call and database messages, the control node entries maintained in the control register 503 are periodically adjusted to maintain a contiguous control register list. An example of this adjustment would be that if the database corresponding to entry 3 in the root array register 501 were deleted, the corresponding control register 503 entry (the control node corresponding to database 3) would also be deleted and all entries following the space left by any entries (e.g., control nodes) associated with database 3 would be shifted up to occupy the area in which the control nodes for database 3 previously resided. As can be seen by the previous example, the numbering of control nodes in the control register 503 is purely for convenience, that is, the numbering need not be sequential as long as the access and memory manager can identify the arbitrarily numbered entries.

An important component of the memory management scheme is a free list register 505. In the preferred embodiment the message memory is coupled to the microcomputer 105 (FIG. 1) via a data bus (not shown) and the memory is addressed via an address bus (not shown). Since most 8-bit microcomputers have only sixteen bits of addressing available, a designer is limited to addressing direct page memory in only the first 32K bytes. The memory management scheme disclosed herein alleviates this limitation by allowing physical memory to be addressed in banks as determined both by the physical size of the address bus associated with a selected microcomputer and by additional bank indexing that can be performed using conventional digital memory management circuitry. The preferred embodiment is capable of accessing at least 128K of external RAM memory organized in four banks of 32K bytes each. These banks are denoted by the four-bit nibble illustrated in the free list 505. Note that the upper nibble of each byte represented in the free list is presently unused, bug is available for further extension of memory addressing capability. Moreover, this architecture lends itself to unlimited expansion of memory by further widening the bit depth of a free list entry.

The memory data area 504 is the area in memory in which the actual received selective call and database messages are stored. The following examples will impart a better understanding of how the memory and access management illustrated in FIG. 5 functions to allocate and deallocate memory for received selective call and database messages.

In allocating a database, suppose that a database configuration message is received by the selective call receiver commanding it to create a database containing twenty entries, each page representing a top of a database. Two conditions must be met before this received command can be executed, there must be an available slot in the root array register 501 in which to store the database, and there must be at least twenty control nodes available in the control register 503. If either of these conditions cannot be met, the create database command cannot be performed. If both conditions are met, an unoccupied slot in the root array register is located and filled with information specific to a new database, including a database number, a message type icon to display, and a control register ID that identifies the twenty control nodes allocated in the control register 503. Each of the twenty control nodes allocated in the control register 503 is appropriately identified as being a member of this new database. At this point, a new database has been created but no memory has actually been used to store any received selective call or database messages.

As database messages are received (or selective call personal messages), the free list 505 is searched for unused entries corresponding to portions of the memory data area 504 that are yet to be allocated. Each time a selective call message is received, only the memory necessary to store the received message is allocated. As memory is allocated, each allocated block is marked as used in the free list.

As an example of deallocation, suppose that the database created above is to be deleted. The root array register 501 contains information about the database to be deleted. When the delete command is performed, the twenty control nodes located in the control register 503 are deleted and the other control nodes are shifted up to maintain a contiguous list in the control register 503. The remaining nodes are shifted up to maintain a contiguous list in the control register 503. As the twenty control nodes are deleted, the free list 505 is updated to show that any memory occupied by messages corresponding to the deleted control nodes is now free to be used as other messages are received and stored. Note that using this architecture, it is not necessary to erase any data stored in the memory data area 504, since the access link via the root array register 501, a control register 503, and the free list 505 is broken, thereby making it impossible to access the message data previously stored in the memory area 504 corresponding to the old database. This is an effective and efficient method for both managing available memory and access to messages that may be stored in the memory.

Figure 6:
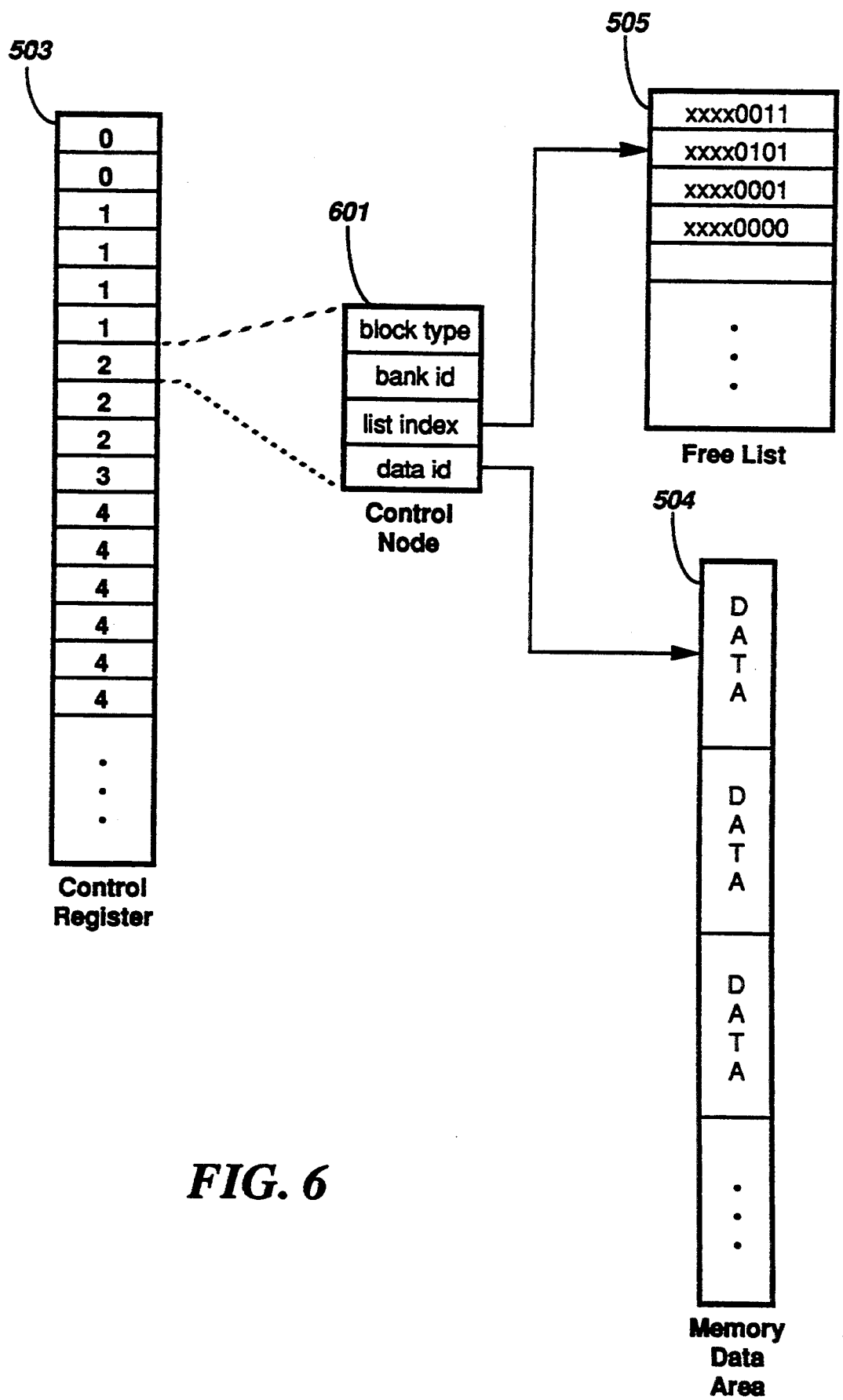
FIG. 6 illustrates a control area register structure for implementing the memory and the message access manager of FIG. 5 in accordance with the preferred embodiment of the present invention.

Referring to FIG. 6, a control area register structure 601 for implementing the memory and the message access manager of FIG. 5 in accordance with the preferred embodiment of the present invention is illustrated. The control area register structure 601 is referred to as a control node and comprises identifiers for managing both memory allocation and data access. Each control node comprises information such as a block type, a bank identifier, a list index, and a data identifier. As depicted in FIG. 6, the list index parameter points to a register in the free list 505 that denotes the location and availability of a memory bank and memory storage block. Similarly, a data identifier associated with the control node 601 points to a specific data block allocated in the memory area 504 for storage of at least a portion of the message associated with the control node 601. It is readily discerned from the discussion and the supporting figures that the control parameters contained in the control node 601 manage both memory allocation and access to stored message data. The elements shown in FIG. 6 allow the memory management and access management features discussed in conjunction with FIGS. 1 and 5 to effectively store and arbitrate access to message data placed in the memory area 504.

Figure 7:
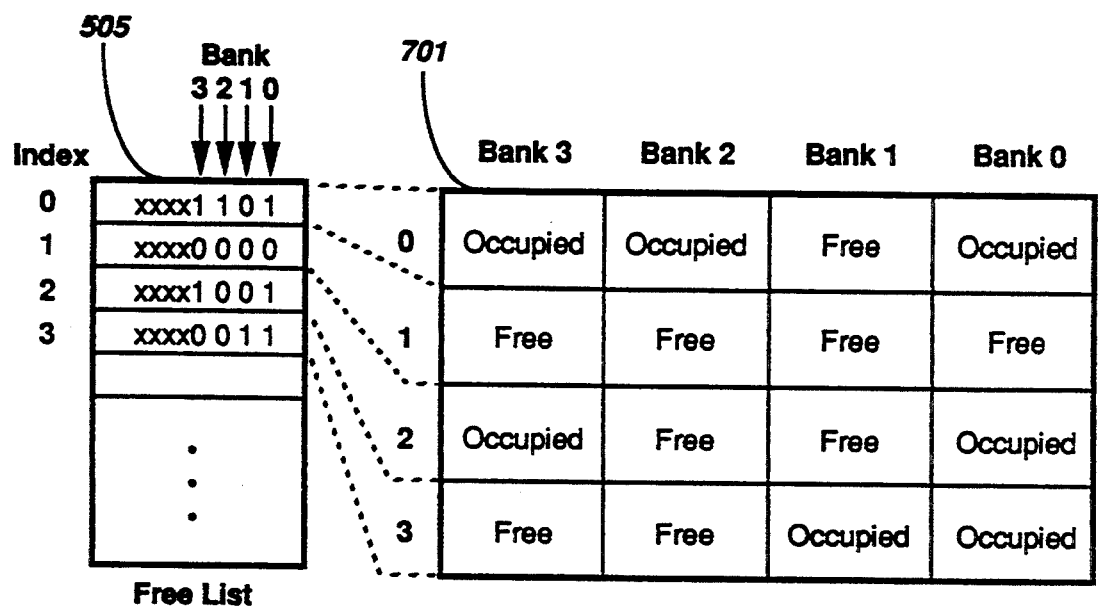
FIG. 7 illustrates a content of at least one exemplary free list register used in implementing dynamic memory allocation and deallocation in accordance with the preferred embodiment of the present invention.

Referring to FIG. 7, a content of at least one exemplary free list register used in implementing dynamic memory allocation and deallocation in accordance with the preferred embodiment of the present invention is illustrated. The free list 505 discussed in reference to FIGS. 5 and 6 is illustrated showing an exemplary register index 0–3 allowing the left side and an exemplary bank index 0–3 along the top of the free list 505. By example, the table 701 explicitly details a meaning of the bank switching bits shown in the free list 505. In this example, a 1 in the free list corresponds to an allocated or occupied entry in table 701. As previously discussed, this implementation yields a simple and effective method to manage the allocation and deallocation of memory both in a direct page mode and in an extended memory paging mode.

Figure 8:
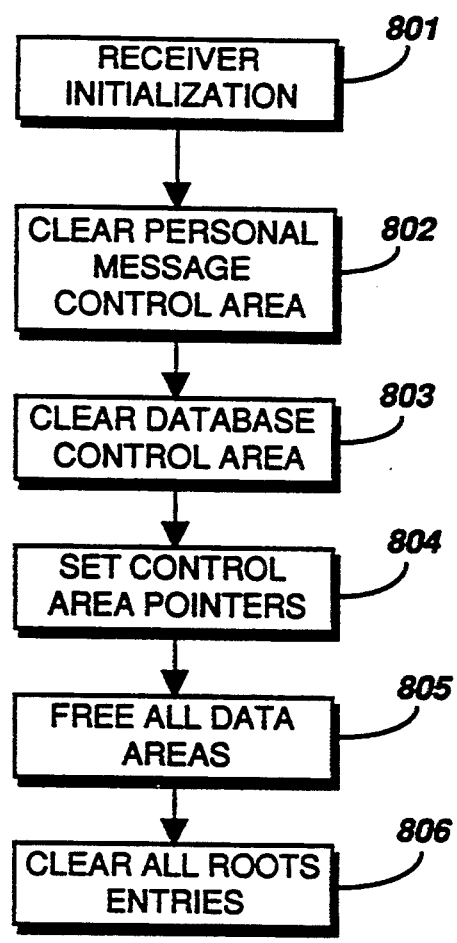
FIG. 8 is a flow diagram illustrating the operation of the selective call receiver of FIG. 1 when initializing the register structure for implementing a memory and a message access manager as shown in FIG. 5.

Referring to FIG. 8, a flow diagram is shown that illustrates the operation of the selective call receiver of FIG. 1 when initializing the register structure for implementing a memory and a message access manager as shown in FIG. 5. Upon power up, the receiver shown in FIG. 1 undergoes initialization 801 of the conventional and unique selective call receiver 801 components shown in FIG. 1. When initialization is complete, the memory and access manager discussed in reference to FIG. 5 clears a personal message control register area 802, clears a database control register area 803, sets initial control area register pointers 804, clears all entries associated with the free list register 505, thereby freeing all memory data areas 805, and clearing all root array register 501 entries 806. The set up described in conjunction with FIG. 8 represents the initial configuration of parameters associated with the access and memory management units shown in FIG. 1.

Figure 9:
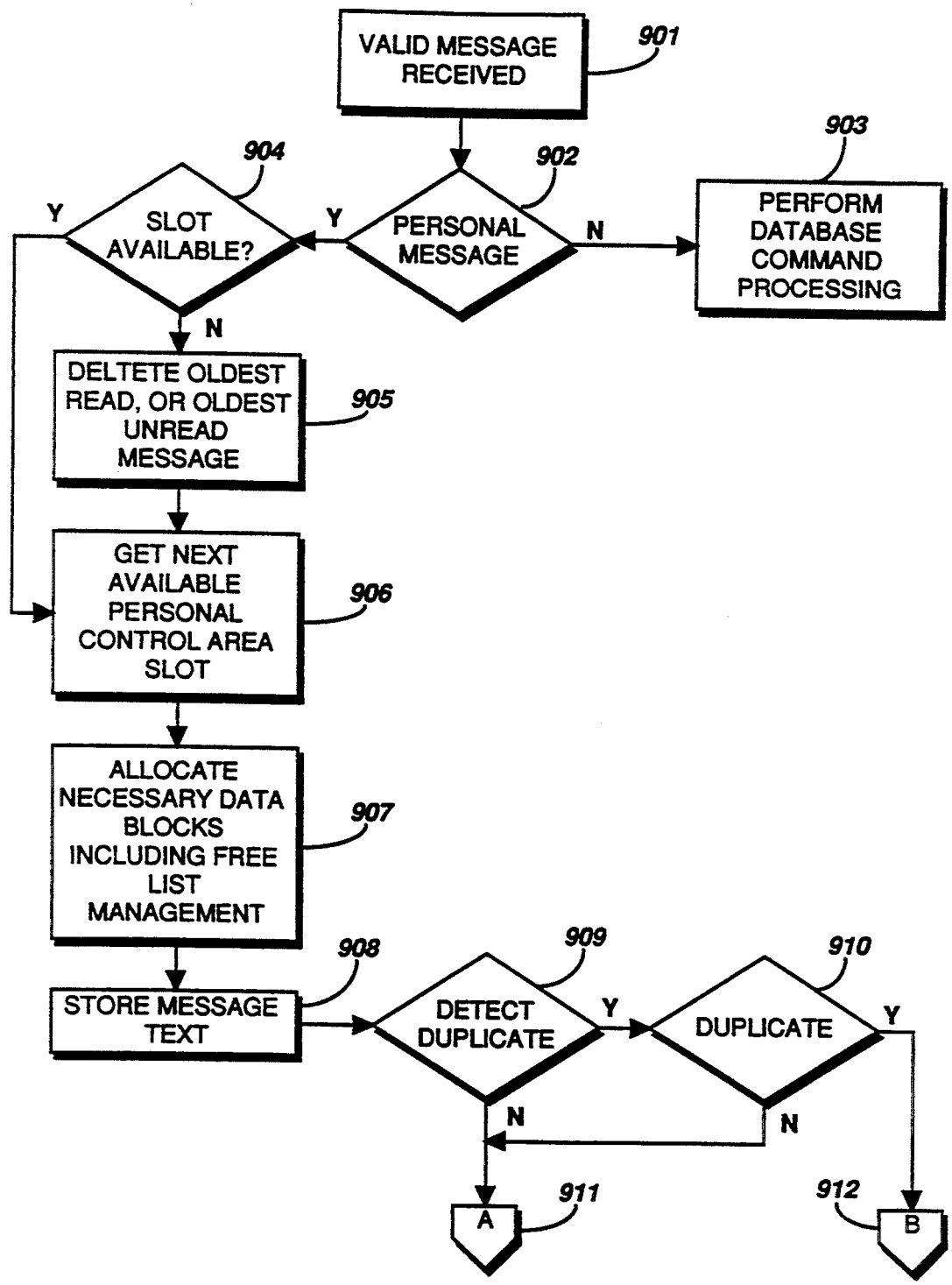
FIG. 9 is a flow diagram illustrating the operation of the selective call receiver of FIG. 1 when receiving a selective call message and determining a message type.

Referring to FIG. 9, the flow diagram illustrates the operation of a selective call receiver of FIG. 1 when receiving a selective call message and determining a message type. Upon receipt of a valid selective call address and message 901, the message is tested to see if it is a personal selective call message or a database selective call message 902. If the message is a database selective call message, database command processing is performed 903. When the message is a personal selective call message, the memory manager of FIG. 5 checks for an available memory slot 904. If no slot is available, the oldest read or oldest unread message is deleted 905 and the next available personal control area slot is made available for message storage 906. If a slot was initially available, the memory manager 119 gives up the next available personal control area slot 906. After obtaining a control register area slot (control node), the memory manager 119 allocates the necessary data blocks and updates the free list 505 as necessary 907. When the necessary memory blocks are allocated, the message text is stored 908 and duplicate detection is performed 909 to further ensure effective utilization of the memory data area 504. Note that duplicate detection is an optional feature that may be enabled via the nonvolatile memory 114 or code plug associated with a selective call receiver illustrated in FIG. 1. If duplicate detection is enabled and a duplicate is detected 910, a routine is executed that prevents the retention of two duplicate messages anywhere in the memory data area 504. If no duplicate is detected or duplicate detection is not selected as a code plug option, normal message processing occurs.

Figure 10:
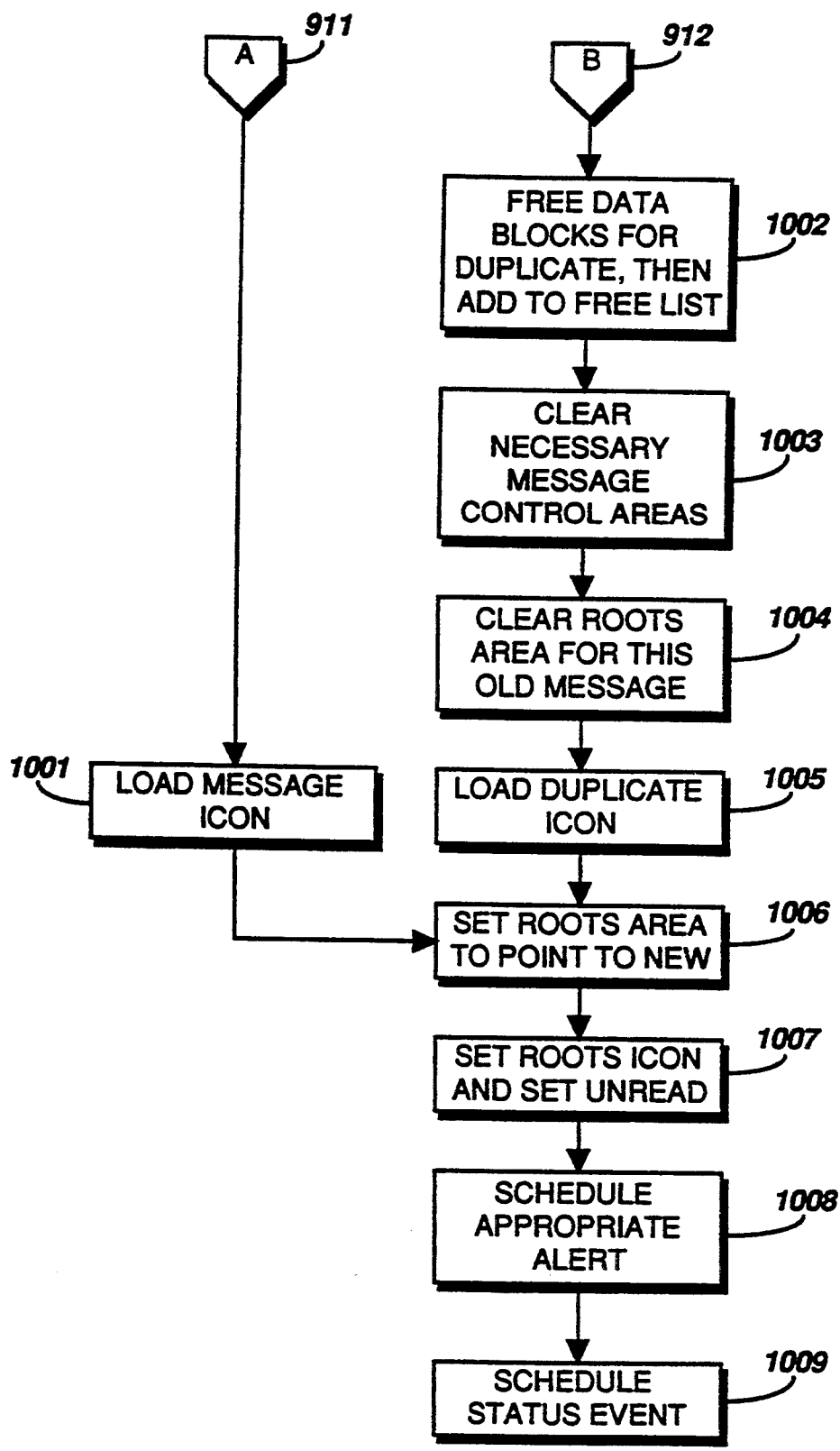
FIG. 10 is a flow diagram illustrating the operation of the selective call receiver of FIG. 1 when processing a received personal selective call message.

Referring to FIG. 10, a flow diagram illustrates the operation of the selective call receiver of FIG. 1 when processing a received personal selective call message. Normal message processing as discussed in reference to FIG. 9 results in loading a message icon representing the received personal selective call message. If a duplicate message was detected, the memory manager 119 frees an appropriate number of data memory blocks for storage of the duplicate message and updates the appropriate free list register or registers 1002. After the free list is updated, any control registers needed are cleared for the message 1003 and the old message is deleted by clearing its associated root array registers 1004. A duplicate message icon is then loaded 1005 to indicate that the received message was duplicate of a previously received message. At this point, the type of message (e.g., personal selective call message) and its status (new or duplicate) has been determined. The root array register entry corresponding to the received message has its status set as illustrated in FIG. 5 to indicate a new message 1006 has been received. Moreover, the new message's status is further modified to indicate that the new message is unread 1007, and according to the mode selected by the user of the selective call receiver, an appropriate alert is scheduled 1008 and executed 1009.

Figure 11:
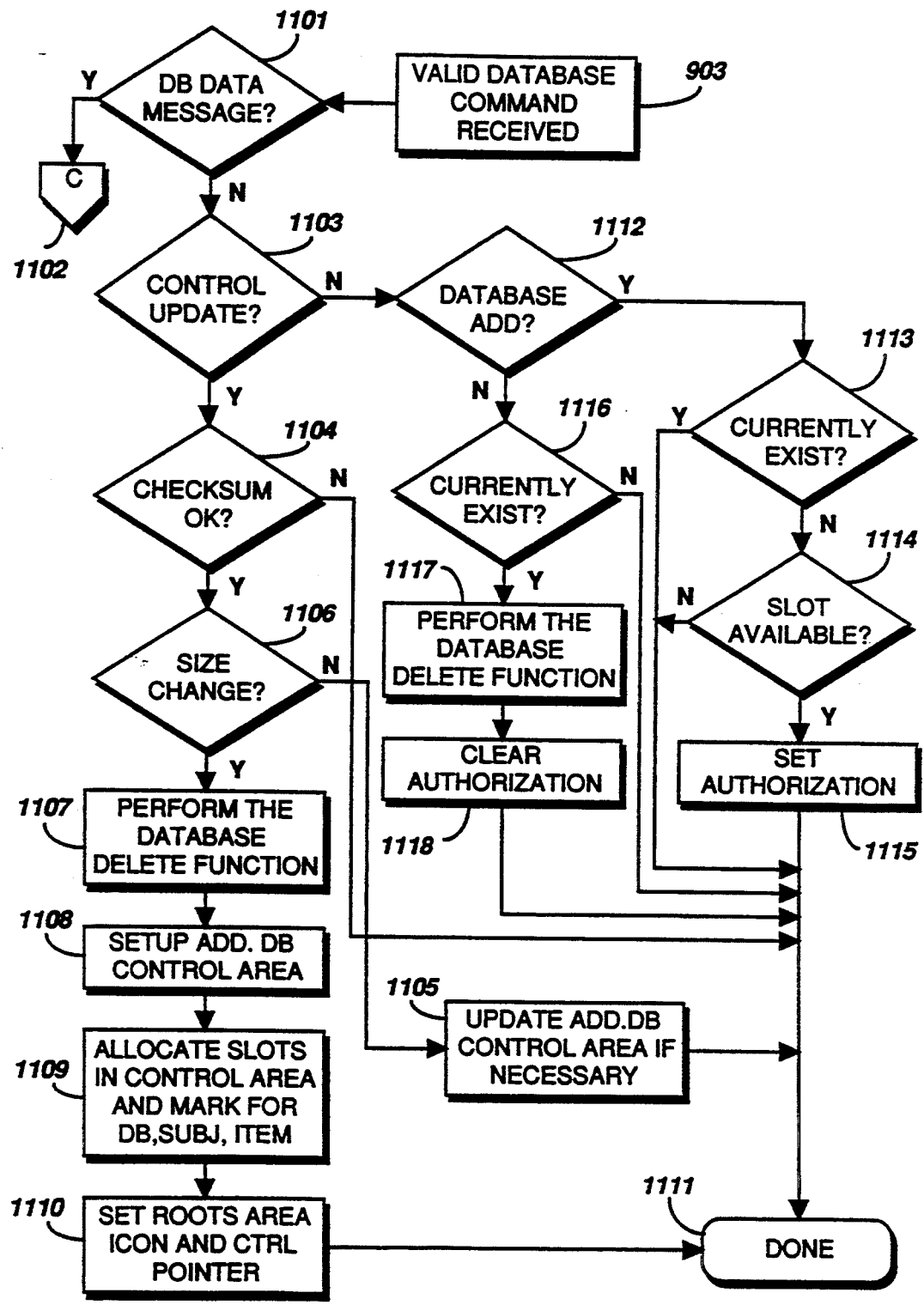
FIG. 11 is a flow diagram illustrating the operation of the selective call receiver of FIG. 1 when processing a received database configuration and data delivery selective call message or a received database add/delete message as shown in FIGS. 3 and 4 respectively.
Figure 12:
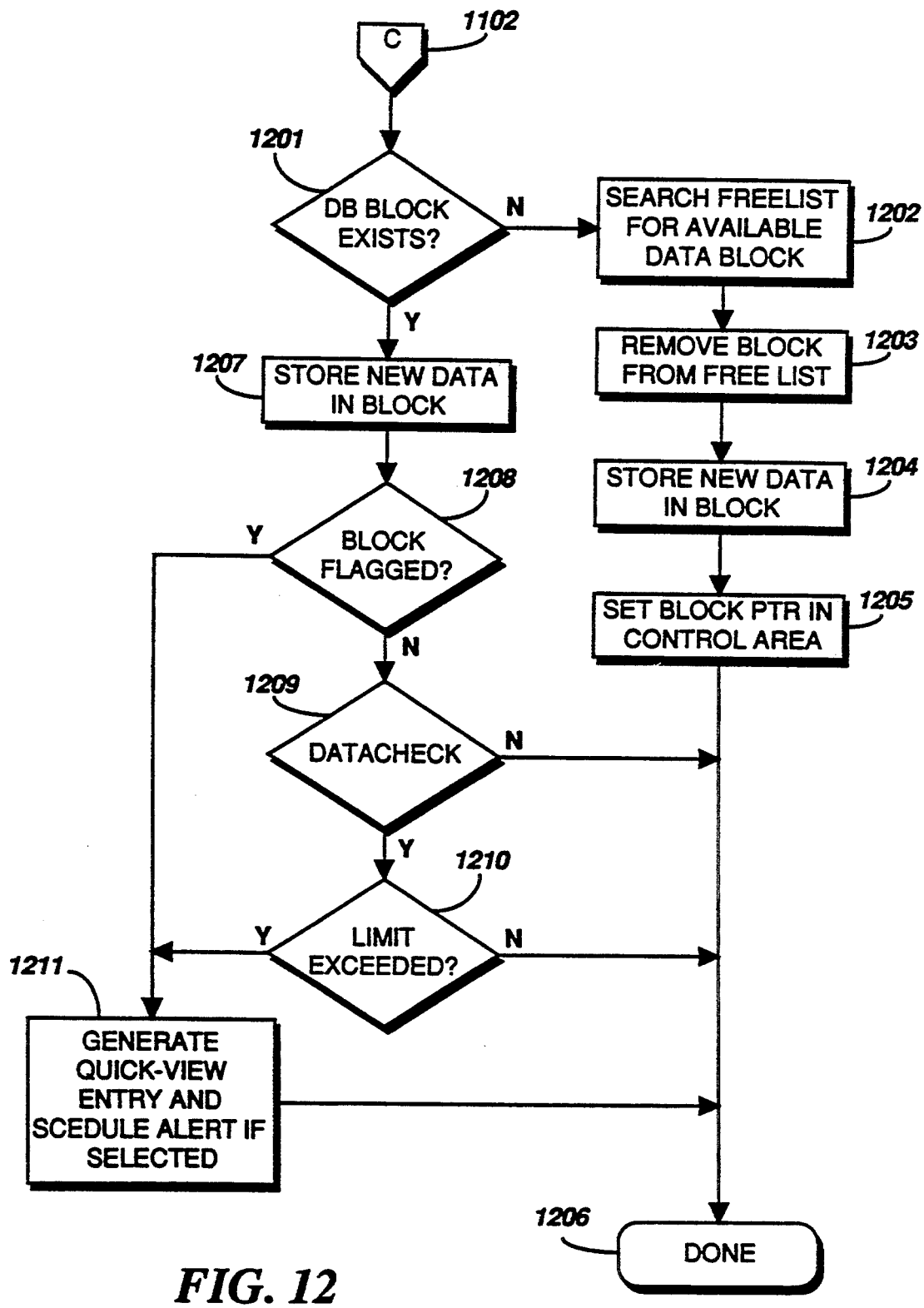
FIG. 12 is a flow diagram illustrating the operation of the selective call receiver of FIG. 1 when updating an existing database with a received database data delivery selective call message as shown in FIG. 3.

Referring to FIG. 11, a flow diagram illustrates the operation of the selective call receiver of FIG. 1 when processing a received database configuration and data delivery selective call message or a received database add/delete message as shown in FIGS. 3 and 4, respectively. When a valid database command is received 903, the received command is tested to see if it is database data delivery selective call message (database update message) 1101. If the received message is a database data delivery message, it is processed as shown in FIG. 12. When the received message is not a database update message, it is further tested to see if it is a database configuration (control) message 1103. If the received message is a database control message, the error check bits shown in FIG. 3 are compared against a computed checksum 1104 to validate the received message as containing no errors. If the received message contains no errors, it is tested for presence of a database size change command 1105 and if it is not a database size change command, the appropriate control register areas are updated 1105 and processing of the database control message is complete 1111. If the database control command indicates a size change, the existing database is deleted 1107, a new control register area is set up 1108, control nodes are allocated in the control register and are updated to reflect the corresponding database subject and item 1109. After this, the corresponding entry in the root array register 501 is updated indicating a message status, database identification, and control register identification 1110 to complete processing of the control update size change 1111. In the event that the received database command was an add/delete command, the received command is tested 1112 to determine whether to add or delete a database. If the command request database deletion, the database identified in conjunction with the command, if it exists 1116, is deleted 1117, and its corresponding authorization is cleared 1118 to complete processing of the database delete command. Similarly, if the received command requests to add a database, existence is checked 1113 and if no database presently exists, a determination is made whether a slot is available 1114. If a slot is available, authorization is set 1115 and command processing is complete. In the event that no slot is available and a database add command has been received, a new database is created.

Referring to FIG. 12, a flow diagram illustrates the operation of the selective call receiver of FIG. 1 when updating an existing database with a received database data delivery selective call message as shown in FIG. 3. As discussed in reference to FIG. 11, if the database command received was a database update message, a test is performed to see if the database block indicated therein exists 1201 and if it does not, the free memory list is searched for an available data block 1202 that is then removed from the free list 1203 and the received message data is stored in that block 1204. The control register node corresponding to the newly received message is updated to indicate receipt of the new message and processing is complete 1206. If the data block did exist, the new data is stored in the existing block 1207 and a test is performed to determine if the block was flagged for an alarm 1208. If the alarm test is true, a quick view entry (e.g., a prioritized message) is generated and an associated alert may be generated. If the data block corresponding to the newly received message was not flagged, but a data check 1209 was enabled and a limit 1210 selected by the user is exceeded, a quick view entry and alert is scheduled as in the instance of the block being flagged 1211. If the block is not flagged, and no data check is enabled or the limit programmed by the user is not exceeded, processing is completed after storage of a new data in the appropriate block 1206.

Figure 13:
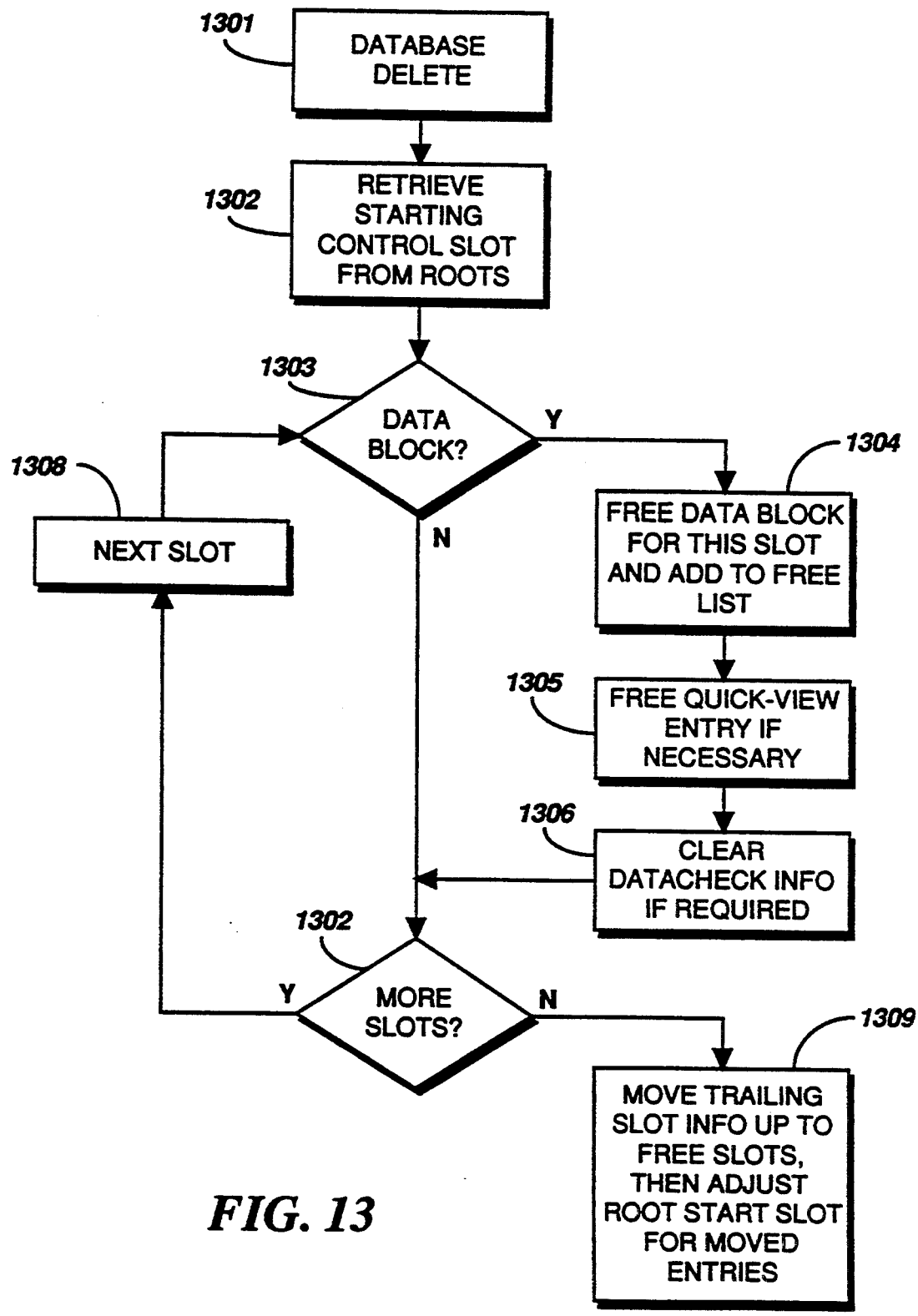
FIG. 13 is a flow diagram illustrating the operation of the selective call receiver of FIG. 1 when deleting an existing database from message memory.

Referring to FIG. 13, a flow diagram illustrates the operation of the selective call receiver of FIG. 1 when deleting an existing database from message memory. When the database delete command is invoked 1301, the starting control register slot or control node of the appropriate database is retrieved from the root array register 1302 and tested to see if there is an allocated data block associated with it 1303. If there is a data block associated with the current control node, the data block is freed and added to the free list 1304 as well as any quick view or data check entries are freed and cleared, respectively, 1305, 1306. If there are more slots associated with the database 1302, the control register is indexed to the next control node 1308 and it is tested for an associated data block 1303 just as with the first control node. If there are no more data blocks and no more slots, the corresponding entries for the selected database delete command are removed from the control register (control nodes deleted), the trailing slot information is shifted up to fill the newly freed slots, and the root array register entries are updated to correctly identify the new positions of these adjusted control nodes in the control register 1309.

We claim:

1. A selective call receiver for facilitating storage and presentation of at least one received selective call message, the selective call receiver comprising:
    a microcontroller including a processor that executes a microcode program for controlling operation of the selective call receiver;
    at least one memory coupled to the microcontroller for storing the at least one received selective call message;
    a memory manager coupled to the microcontroller for controlling allocation and deallocation of at least one memory block in the at least one memory, each memory block corresponding to a memory storage area capable of storing at least a portion of the at least one received selective call message, the memory manager operating to maintain a dynamic list representing used and unused memory blocks, the dynamic list being initialized in response to receipt of a database configuration message and updated in response to subsequent received selective call messages; and
    an access manager coupled to the microcontroller for controlling access to the at least one received selective call message stored in the at least one memory by grouping the at least one received selective call message in at least one classification as determined at least in part by a portion of the at least one received selective call message and the database configuration message.

2. The selective call receiver according to claim 1 wherein the memory manager comprises:
    at least one root array register with contents comprising:
        a message status indicator, a database identifier, and a control area register identifier.

3. The selective call receiver according to claim 1 wherein the memory manager comprises:
    at least one control area register with contents comprising:
        a type of the at least one memory block, a memory bank identifier indicating a memory bank location, an index to the dynamic list representing used and unused memory blocks, and a data identifier indicating a memory location for the data.

4. A selective call receiver, comprising:
    a receiver for providing a received signal;
    a demodulator for recovering the received signal and providing a received selective call message;
    a decoder for correlating a recovered address contained within the received selective call message with a predetermined address recovered from a non-volatile memory associated with the selective call receiver, the predetermined address being the selective call receiver's address;
    a microcontroller coupled to the decoder, the microcontroller having a processor that executes a microcode program for controlling operation of the selective call receiver and facilitates presentation of the received selective call message;
    at least one memory coupled to the microcontroller for storing the received selective call message;

a memory manager coupled to the microcontroller for controlling allocation and deallocation of at least one memory block in the at least one memory, each memory block corresponding to a memory storage area capable of storing at least a portion of the at least one received selective call message, the memory manager operating to maintain a dynamic list representing used and unused memory blocks, the dynamic list being initialized in response to receipt of a database configuration message and updated in response to subsequent received selective call messages; and an access manager coupled to the microcontroller for controlling access to the at least one received selective call message stored in the at least one memory by grouping the at least one received selective call message in at least one classification as determined at least in part by a portion of the at least one received selective call message and the database configuration message.

5. The selective call receiver according to claim 4 wherein the memory manager comprises:
at least one root array register with contents comprising:
a message status indicator, a database identifier, and a control area register identifier.

6. The selective call receiver according to claim 4 wherein the memory manager comprises:
at least one control area register with contents comprising:
a type of the at least one memory block, a memory bank identifier indicating a memory bank location, an index to the dynamic list representing used and unused memory blocks, and a data identifier indicating a memory location for the data.

7. In a selective call receiver, a method for facilitating storage and presentation of at least one received selective call message comprising the steps of:
(a) executing a microcode program in a microcontroller having a processor, the microcontroller being coupled to at least one memory for storing the at least one received selective call message, and the microcode program operating to control operation of the selective call receiver;
(b) controlling allocation and deallocation of at least one memory block in the at least one memory with a memory manager coupled to the microcontroller, each memory block corresponding to a memory storage area capable of storing at least a portion of the at least one received selective call message, the memory manager operating to maintain a dynamic list representing used and unused memory blocks, the dynamic list being initialized in response to receipt of a database configuration message and updated in response to subsequent received selective call messages; and
(c) controlling access to the at least one received selective call message stored in the at least one memory with an access manager coupled to the microcontroller by grouping the at least one received selective call message in at least one classification as determined at least in part by a portion of the at least one received selective call message and the database configuration message.

8. The method according to claim 7 wherein step (b) comprises the step of:
at receiver initialization:
releasing all memory associated with the dynamic list resulting in all personal message and database control area indentifiers being set to unused, thereby freeing all available memory blocks for data storage.

9. The method according to claim 7 wherein step (b) comprises the step of:
creating a selective call database, comprising the steps of:
receiving the database configuration message comprising a database creation command and a database ID;
allocating a root array register in response to the database creation command, the root array register comprising entries denoting the database ID, a message type icon to display, and a control register ID;
allocating at least one control node in a control register in response to the database creation command, the at least one control node comprising entries denoting a memory block type, a memory bank ID, a free list index, and a message data ID;
updating a free list to reflect use of memory by the at least one control node; and
storing subsequently received database data update messages of a same database ID in memory blocks allocated in response to entries in the root array register.

10. The method according to claim 7 wherein step (b) comprises the step of:
deleting a selective call database, comprising the steps of:
receiving the database configuration message comprising a database delete command and a database ID;
deallocating at least one control node identified in a root array register in response to the database delete command, the at least one control node having a database ID corresponding to the database ID associated with the database delete command, leaving at least one unallocated control node in place of the at least one control node;
adjusting any remaining control nodes following the at least one unallocated control node to maintain a contiguous control node list in the control register;
updating a free list to reflect availability of memory previously reserved by the at least one control node;
clearing all contents of the root array register corresponding to the database ID associated with the database delete command.

11. The method according to claim 7 wherein step (b) comprises the step of:
updating a selective call database, comprising the steps of:
receiving a database data delivery selective call message comprising a database update message and a database ID;
inspecting a control register and at least one control node associated with the database ID to determine if a memory block is already allocated for the database update message;
allocating at least one control node in a control register if the memory block has not been allocated, the at least one control node comprising entries denoting a memory block type, a memory bank ID, a free list index, and a message data ID;
updating a free list to reflect use of the memory block by the at least one control node; and
storing at least a portion of the received database update message in the memory block allocated in response to entries in the at least one control node.

* * * * *